Oct. 29, 1963   J. H. MILLER   3,108,911
BATTERY VENT PLUGS
Filed June 2, 1961

INVENTOR
JAMES H. MILLER
BY John E. Strayken
ATTORNEY

United States Patent Office 3,108,911
Patented Oct. 29, 1963

3,108,911
BATTERY VENT PLUGS
James H. Miller, Minneapolis, Minn., assignor to Gould-National Batteries, Inc., St. Paul, Minn., a corporation of Delaware
Filed June 2, 1961, Ser. No. 114,393
9 Claims. (Cl. 136—177)

This invention relates to vent plugs for storage batteries, and particularly to improved means for preventing the splashing or spewing of electrolyte from the batteries when they are subjected to severe vibration or jarring, while permitting the gas evolved in the battery during its use to pass freely from the interior to the atmosphere.

It is well known that a vented wet battery installed in an automobile or tractor which is driven over rough surfaces can be shaken so violently that electrolyte will be forced out of the vent holes in the filling well plugs located on the battery cover. Loss of electrolyte from a vented battery occurs, for example, when new automobiles are transported on carrier truck trailers, the corrosive electrolyte ejected from batteries as a result of vibration of the automobiles during transit causing damage to hoods and metallic engine components. An additional inconvenience resulting from such vibration is that of replacing the lost electrolyte in order to bring the battery back to its proper electrochemical condition. Although many vent plugs have been designed in the attempt to prevent the above-described escape of electrolyte from wet batteries, most are complicated in structure and consequently expensive to manufacture.

It is, therefore, an object of the present invention to provide a battery vent plug which will effectively eliminate splashing or spewing of electrolyte from a battery when it is subjected to violent vibration, and which will be simple to manufacture and easy to assemble.

It is a particular object of the present invention to provide a battery vent plug having an arrangement of internal baffles which will effectively block the passage of fine droplets of electrolyte through the vent plug to the atmosphere, permit the free flow of gas through the vent plug to the atmosphere, and provide rapid and unrestricted drainage of electrolyte which collects on the baffles back into the interior of the battery.

Figure 1:
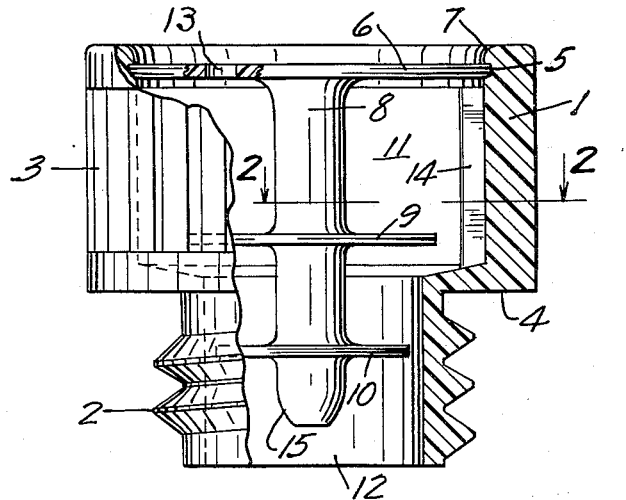
Figure 2:
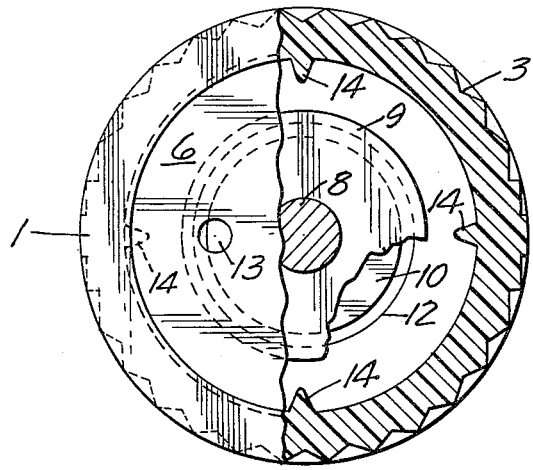

In the accompanying drawings, which illustrate a preferred embodiment of my invention by way of example and not for the purpose of limitation:

FIGURE 1 is a part side elevational view and part vertical sectional view of the vent plug assembly, and FIG. 2 is a part top plan view and part sectional view taken on the line 2—2 of FIG. 1.

As illustrated, the vent plug has a tubular upper body member 1 and a threaded lower body member 2 of reduced diameter by means of which the plug may be secured in the filling well of a battery cover. Corrugations 3 may be formed on the outer periphery of the upper body member 1 to facilitate tightening the plug in the filling well to establish a liquid-tight seal between a shoulder 4 on the plug and an opposing surface of a battery cell cover (not shown). A groove 5 is formed in the inner wall of the body member 1 near the top thereof to provide means for attaching a circular closure 6 to the upper end of the tubular body. This body and the closure 6 may be molded or otherwise formed from a resilient plastic material, e.g., polypropylene and has a rounded lip 7 above the groove 5 so that the closure 6 and the stem and baffle members carried thereby may be inserted in the tubular body 1 and pressed down until the closure 6 snaps into the groove 5 to securely fasten the parts together in a unitary plug assembly.

As indicated in FIG. 1, a coaxially disposed stem 8 depends from the closure 6 to support vertically spaced, circular baffles 9 and 10 within an upper chamber 11 and lower chamber 12 respectively of the vent plug body. This combination upper end closure and baffle assembly may be integrally molded from a suitable plastic material of which polypropylene is an example. A small, preferably off-center, hole 13 in the closure 6 constitutes the sole gas vent between the chamber 11 and atmosphere. The otherwise substantially cylindrical inner surface of the body member 1 is formed with a plurality of vertically extending ridges 14 which function as baffles to intercept upwardly spiralling spray and return it through the chamber 12 to the electrolyte in the battery cell. At its lower end the chamber 12 is in continuous communication with the space above the electrolyte in the battery cell.

The diameters of the baffles 9 and 10 are such that there are narrow annular spaces between the walls of the chambers 11 and 12 and the peripheries of the respective baffles. This arrangement provides baffles having a maximum impingement area for intercepting electrolyte spray and splash combined with an unrestricted path by which gas may escape from the battery. An extension 15 of the stem 8 projects below the baffle 10 and performs the function of a drip rod to collect electrolyte splash and spray and direct them back into the battery cell.

Extensive tests of this invention show that my improved baffle structure is much more effective in preventing the discharge of electrolyte under adverse conditions caused by vibration than conventional arrangements of internal baffles which extend wall to wall within a tubular body and have one or more relatively small holes in each baffle. Such conventional baffles allow electrolyte to accumulate above the baffles where it cannot drain back into the battery quickly through the small vent holes after having been forced through the holes by a violent jarring of the battery. Other advantageous characteristics of my invention are its low cost, ease of assembly and compactness.

I claim:

1. A vent plug for the filling well of a wet battery comprising, a tubular body having upper and lower end openings, an upper portion of said body defining a tubular wall of an upper baffle chamber, and a lower portion of said body defining a tubular wall of a lower baffle chamber of relatively smaller diameter than said upper chamber wall; a closure for said upper end opening formed with a relatively small vent hole; means securing said closure to the upper end of said tubular body; a normally substantially vertical stem depending centrally from and fixed on said closure; a plurality of annular baffles fixed on said stem in vertically spaced relation one to another, at least one of said baffles being disposed in said upper baffle chamber and another of said baffles being disposed in said lower baffle chamber, said plurality of baffles including one baffle which is larger in diameter than said lower chamber and is disposed in said upper chamber, the outer peripheries of said baffles being spaced from said tubular walls of said upper and lower chambers respectively to provide restricted substantially annular passages for liquid and gas within the respective baffle chambers.

2. A vent plug in accordance with claim 1 in which said tubular body is formed with an annular groove in its inner surface spaced downwardly from its upper end, and said closure has a periphery adapted to fit in said groove and is formed from material which is sufficiently resilient and flexible to permit the periphery of said closure to be pressed into said groove to secure said closure to said tubular body.

3. A vent plug in accordance with claim 1 including an extension of said stem projecting downwardly from and in coaxial relation to said baffle in the lower baffle chamber.

4. A vent plug in accordance with claim 1 in which the tubular wall of said upper baffle chamber has a plurality of circumferentially spaced, vertically elongated ridges projecting therefrom for intercepting upwardly spiraling liquid in said tubular body.

5. A vent plug in accordance with claim 1 in which said annular baffles are imperforate.

6. A vent plug in accordance with claim 1 in which said vent hole in said closure is spaced radially inward from the tubular wall of said upper baffle chamber.

7. A vent plug for the filling well of a wet battery comprising, a tubular body having upper and lower end openings, an upper portion of said body defining a tubular wall of an upper baffle chamber, and a lower portion of said body defining a tubular wall of a lower baffle chamber of relatively smaller diameter than said upper chamber wall; a closure for said upper end opening formed with a relatively small vent hole; means securing said closure to the upper end of said tubular body; a normally substantially vertical stem depending centrally from and fixed on said closure; a plurality of annular baffles fixed on said stem in vertically spaced relation one to another, at least one of said baffles being disposed in said upper baffle chamber and another of said baffles being disposed in said lower baffle chamber, the outer peripheries of said baffles being spaced from said tubular walls of said upper and lower chambers respectively to provide restricted substantially annular passages for liquid and gas within the respective baffle chambers.

8. A vent plug in accordance with claim 7 in which said baffles are circular and the baffle disposed in said upper baffle chamber is disposed in the lower portion thereof and is of greater diameter than the diameter of said lower baffle chamber.

9. A vent plug in accordance with claim 7 in which said baffle disposed in said upper chamber is greater in diameter than the baffle disposed in said lower chamber.

References Cited in the file of this patent

UNITED STATES PATENTS

| | | |
|---|---|---|
| 1,736,115 | Ford | Nov. 19, 1929 |
| 2,214,803 | Wells | Sept. 17, 1940 |
| 2,631,182 | Hall et al. | Mar. 10, 1953 |
| 2,708,214 | Galloway | May 10, 1955 |

FOREIGN PATENTS

| | | |
|---|---|---|
| 822,437 | France | Sept. 20, 1937 |